UNITED STATES PATENT OFFICE.

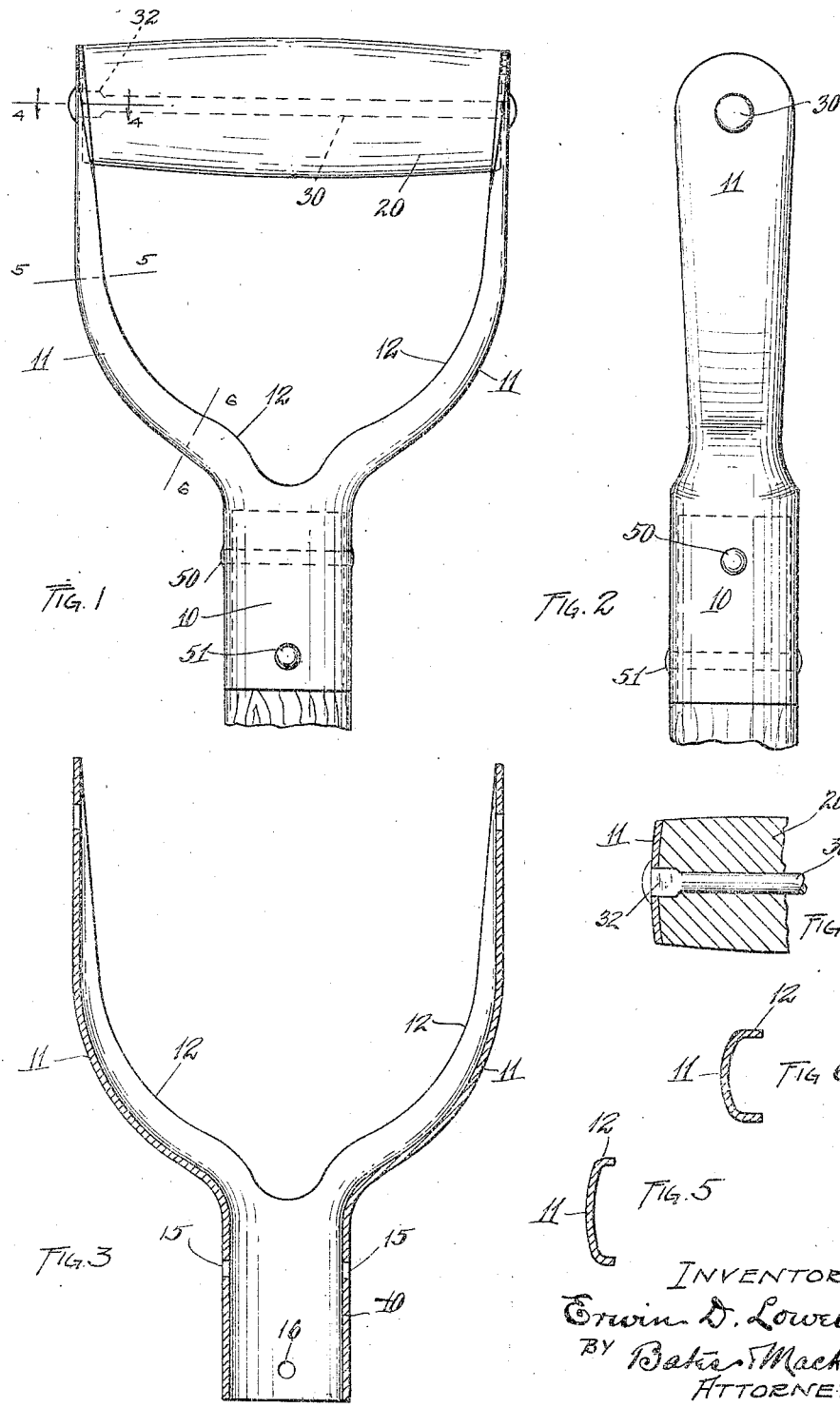

ERWIN D. LOWELL, OF CLEVELAND HEIGHTS, OHIO, ASSIGNOR TO THE AMERICAN FORK & HOE COMPANY, OF CLEVELAND, OHIO, A CORPORATION OF OHIO.

HANDLE FOR AGRICULTURAL TOOLS.

1,290,261.     Specification of Letters Patent.     Patented Jan. 7, 1919.

Application filed October 21, 1918. Serial No. 258,930.

*To all whom it may concern:*

Be it known that I, ERWIN D. LOWELL, a citizen of the United States, residing at Cleveland Heights, in the county of Cuyahoga and State of Ohio, have invented a certain new and useful Improvement in Handles for Agricultural Tools; of which the following is a full, clear, and exact description, reference being had to the accompanying drawings.

This invention relates to that type of handles commonly known as D-tops, suitable for various agricultural tools. The object of the invention is to provide a handle of this character, having a metal body and a wooden hand grip, which shall be as satisfactory to the user of the tool as the standard wooden D-top, while being more durable and at the same time cheaper.

Experience has demonstrated that the wooden D-top handle integral with the wooden shank is, when new, more satisfactory to the user than any other type of handle; but these wooden D-tops, integral with the handle shank, have necessitated a great waste of material at each side of the shank, and required much labor in forming them. Moreover the wooden tops are liable to split or sliver in use and the hand grip portion (being integral and having its grain crosswise) is very liable to become split from the rest of the D-top or severed intermediately, rendering the handle unfit for satisfactory use. On the other hand metal D-tops have been proposed, but they have lacked the strength of the wooden tops and frequently have failed to hold the hand grip tight or to remain tight on the wooden shank.

The D-top which is the subject of the present invention has been devised, after much experimenting, with a view to producing a metal top which shall have all the strength, stiffness and tightness of the standard wooden top and the further characteristics of greater durability and less cost of construction. To this end, I have provided a D-top, the body portion of which is made out of sheet metal and has a tubular shank from which extend integral curved arms which are laterally channel shaped in cross section, the channel flanges diminishing from the shank to the free ends of the arms, while between the arms is a wooden hand grip with its grain extending lengthwise of the grip and held in rigid relation to the metal body.

This D-top is illustrated in the drawings hereof, and is hereinafter more fully described.

In the drawings Figure 1 is a side elevation of my D-top complete, with a portion of an attached wooden handle shank; Fig. 2 is an edge view of the same; Fig. 3 is a vertical central section of the D-top in a plane parallel with Fig. 1; Figs. 4, 5 and 6 are cross sections through the arms of the D-top at points indicated by the corresponding numbered lines on Fig. 1.

As shown in the drawings, 10 indicates the tubular shank of the D-top, which is substantially cylindrical and open above and below. From the upper edge of this tubular shank extend the curved arms 11. These arms as they leave the shank are substantially semi-circular in cross section but quickly become substantially channel shaped, as indicated by the cross section at 6—6. That is to say, the arms have edge flanges 12 projecting inwardly and an intermediate approximately flat portion. These flanges are of considerable depth adjacent to the tubular shank but are gradually reduced as one progresses toward the free end, while before such free end is reached the flanges disappear altogether. Adjacent to the free end the arm is simply concaved inwardly as shown in Fig. 4. The width of the metal constituting an arm is substantially equivalent to the diameter of the shank. Where the arms join the shank they merge gradually with it. After they have left the shank the arm at first appears narrower in edge view because the channel flanges are of greater depth, as shown in Figs. 2 and 6, then as the flanges become of less depth the intermediate portion of the arm becomes wider, as indicated by Fig. 5 until at the central plane of the hand grip the flanges disappear altogether as indicated in Fig. 4.

The described arrangement of edge flanges gives a very strong body, preventing any liability of the arms breaking off at the tubular shank, while the reduction of the depths of the flanges adjacent to the hand grip allows more room for the user's hand without unduly widening the body or lengthening the hand grip.

Such a D-top body as described may be conveniently stamped from a single piece of flat sheet metal, the blank portion for the shank being then bent into a cylindrical shape and the meeting edges welded together.

20 indicates the hand grip for the D-top. This is a round member of wood having its grain extending longitudinally, the ends of the grip abutting the inner face of the arms and being convexly curved to make a snug fit, as shown in Fig. 4. Extending through the arms and the hand grip is a continuous rivet 30 which is upset on the outer sides of the arms. The concavity of the arms where they engage the hand grip and the corresponding convexity at the end of the grip are designed to prevent the hand grip turning on its axis. Turning may be further prevented by giving a non-circular cross section to one of the end portions of the rivet as shown at 32, such portion (shown as squared) fitting a correspondingly shaped hole in the arm and extending into the hand grip.

To effectively secure the D-top to the wooden shank I make two pairs of holes 15 and 16 through the D-top, one pair being at right angles to the other. Rivets 50 and 51 extend through the shank and occupy the alined holes of the respective pairs, and by passing through the shank at right angles effectively and tightly hold the D-top to the shank, even though shrinkage of the wooden shank might cause it to become smaller than the interior of the metal shank.

A D-top constructed as described is light and cheap, at the same time by reason of the channel shaped arms is extremely strong. It provides ample space for the operator's hand. It is readily put in place and firmly holds its position on the wooden handle of the tool. Should occasion require, however, the top may be readily removed by cutting off heads of the two rivets 50 and 51 and driving these rivets out.

Having thus described my invention what I claim is:

1. A handle for agricultural tools, comprising a tubular shank of metal and integral metal arms extending from the upper end of the shank and curving outwardly to bring their end portions into substantial parallelism, each arm being substantially channel-shaped in cross section having inwardly extending flanges at its edges, which flanges decrease in depth substantially continuously from the shank to the free ends, and a hand grip between the arms.

2. A handle for agricultural tools, comprising a tubular metal shank, having metal arms extending from the shank on opposite sides thereof, which arms are channel shaped in cross section, the flanges decreasing in depth substantially continuously from the shank to the free end of the arm, and the intermediate portion of the channel widening corresponding to the reduction in depth of the flanges, and a hand grip between the end portions of the arms.

3. A handle for agricultural tools, comprising a tubular shank of sheet metal, integral sheet metal arms extending from the upper end of the shank and curving outwardly to bring their end portions into substantial parallelism, each arm having inwardly extending flanges at its edges which decrease in depth toward the free end, a hand grip between the arms having its ends abutting the inner face of the arms, and a through rivet extending through the arms and the hand grip, said rivet having near one end a non-circular portion occupying a non-circular opening in one of the arms and extending into the hand grip.

In testimony whereof, I hereunto affix my signature.

EDWIN D. LOWELL.